United States Patent
Bartsch et al.

(10) Patent No.: US 11,212,655 B2
(45) Date of Patent: Dec. 28, 2021

(54) METHOD FOR TRANSMITTING DATA IN A TRANSPORTATION VEHICLE COMMUNICATION NETWORK, TRANSPORTATION VEHICLE COMMUNICATION NETWORK, PARTICIPANT, AND TRANSPORTATION VEHICLE

(71) Applicant: VOLKSWAGEN AKTIENGESELLSCHAFT, Wolfsburg (DE)

(72) Inventors: Patrick Bartsch, Wolfsburg (DE); Martin Wuschke, Meine (DE)

(73) Assignee: Volkswagen Aktiengesellschaft

( * ) Notice: Subject to any disclaimer, the term of this patent is extended or adjusted under 35 U.S.C. 154(b) by 108 days.

(21) Appl. No.: 16/348,469

(22) PCT Filed: Nov. 2, 2017

(86) PCT No.: PCT/EP2017/078069
§ 371 (c)(1),
(2) Date: May 8, 2019

(87) PCT Pub. No.: WO2018/099683
PCT Pub. Date: Jun. 7, 2018

(65) Prior Publication Data
US 2019/0274019 A1  Sep. 5, 2019

(30) Foreign Application Priority Data
Nov. 9, 2016  (DE) .................... 10 2016 221 985.5

(51) Int. Cl.
*H04W 4/48*  (2018.01)
*H04W 8/04*  (2009.01)
(Continued)

(52) U.S. Cl.
CPC ............... *H04W 4/48* (2018.02); *H04W 4/08* (2013.01); *H04W 8/04* (2013.01); *H04W 8/26* (2013.01); *H04W 60/00* (2013.01)

(58) Field of Classification Search
None
See application file for complete search history.

(56) References Cited

U.S. PATENT DOCUMENTS 8,417,684 B2 * 4/2013 Gu .................... G06F 16/951
707/706
8,495,170 B1 * 7/2013 Vosshall .................. H04L 67/16
709/217
(Continued)

FOREIGN PATENT DOCUMENTS

CN   103563295 A   2/2014
CN   105812234 A   7/2016
(Continued)

OTHER PUBLICATIONS

Gopu et al.; Service Oriented Architecture based connectivity of Automotive ECUs; 2016 International Conference on Circuit, Power and Computing Technologies; IEEE; Mar. 18, 2016.
(Continued)

*Primary Examiner* — Alpus Hsu
(74) *Attorney, Agent, or Firm* — Barnes & Thornburg LLP (57) ABSTRACT

A method for transmitting data between at least two participants in a transportation vehicle communication network of a transportation vehicle. At least one participant of the transportation vehicle communication network is a transportation vehicle participant arranged in the transportation vehicle, and the transportation vehicle participant forms or provides a registration server of the transportation vehicle communication network. In a registration process, the at least one additional participant transmits information on a
(Continued)

service category of at least one service provided by the additional participant and information on a service address to the registration server, and the registration server retrievably stores the participant-specific service category and the participant-specific service address.

18 Claims, 2 Drawing Sheets

(51) Int. Cl.
    *H04W 60/00*     (2009.01)
    *H04W 4/08*     (2009.01)
    *H04W 8/26*     (2009.01)

(56) References Cited

U.S. PATENT DOCUMENTS

| | | | | |
|---|---|---|---|---|
| 9,373,207 | B2* | 6/2016 | Ricci | H04W 76/11 |
| 9,438,698 | B2 | 9/2016 | Kim et al. | |
| 2007/0236346 | A1 | 10/2007 | Helal et al. | |
| 2012/0157050 | A1* | 6/2012 | Kang | H04W 4/70 |
| | | | | 455/411 |
| 2012/0254961 | A1* | 10/2012 | Kim | H04L 67/42 |
| | | | | 726/7 |
| 2014/0019522 | A1* | 1/2014 | Weng | G06F 16/903 |
| | | | | 709/203 |
| 2015/0046206 | A1* | 2/2015 | Kelley | G06Q 10/06311 |
| | | | | 705/7.13 |
| 2016/0050265 | A1* | 2/2016 | Botticelli | H04L 67/125 |
| | | | | 709/219 |
| 2016/0241601 | A1* | 8/2016 | Le Rouzic | H04L 65/1073 |
| 2017/0295154 | A1* | 10/2017 | Jackson | H04L 67/12 |
| 2019/0049942 | A1* | 2/2019 | Dusane | B60R 25/04 |

FOREIGN PATENT DOCUMENTS

| | | |
|---|---|---|
| CN | 105873137 A | 8/2016 |
| DE | 102007062114 A1 | 7/2009 |
| DE | 102014201948 A1 | 8/2015 |
| DE | 102014201954 A1 | 8/2015 |
| DE | 102015200947 B3 | 4/2016 |
| DE | 102015207483 A1 | 5/2016 |
| DE | 102014225802 A1 | 6/2016 |

OTHER PUBLICATIONS

Search Report for International Patent Application No. PCT/EP2017/078069; dated Jan. 29, 2018.

3GPP TSG-RAN WG3 Meeting #92; R3-161170; Change Request; Nanjing, China; May 23-27, 2016.

Office Action for Chinese Patent Application No. 201780068991.9; dated Jan. 11, 2021.

* cited by examiner

METHOD FOR TRANSMITTING DATA IN A TRANSPORTATION VEHICLE COMMUNICATION NETWORK, TRANSPORTATION VEHICLE COMMUNICATION NETWORK, PARTICIPANT, AND TRANSPORTATION VEHICLE

PRIORITY CLAIM

This patent application is a U.S. National Phase of International Patent Application No. PCT/EP2017/078069, filed 2 Nov. 2017, which claims priority to German Patent Application No. 10 2016 221 985.5, filed 9 Nov. 2016, the disclosures of which are incorporated herein by reference in their entireties.

SUMMARY

Illustrative embodiments relate to a method for data transmission in a transportation vehicle communication network and a transportation vehicle communication network, as well as a participant of the transportation vehicle communication network and transportation a vehicle.

BRIEF DESCRIPTION OF THE DRAWINGS

The disclosed embodiments will be described in more detail with reference the drawings, in which.

DETAILED DESCRIPTION

A large number of control devices are usually present in transportation vehicles which, for example, provide various services or which can use provided services, e.g. multimedia services or infotainment services. A transmission of data between the control devices is necessary for this purpose. This data transmission usually takes place over a transportation vehicle communication network.

With the progress of electronics, control and communication technology, in addition to purely mechanical or electromechanical equipment, systems are present in many kinds of transportation vehicle, in particular, motor vehicles, in which in most cases a large number of control devices, including multimedia and infotainment devices, are present. These devices usually communicate with one another. Various bus systems and on-board network systems are known for the implementation of such communication connections, such as, for example, those according to the CAN (Controller Area Network) standard (ISO 11898), the Flexray standard (ISO 17458-1 to 17458-5), the LIN (Local Interconnect Network) de-facto standard, or the MOST (Media Oriented Systems Transport) de-facto standard for multimedia and infotainment networks in the automobile industry.

Further communication network technologies are additionally known from the field of computer technology and network technology, in particular, Ethernet and the IP (Internet Protocol) communication by data packets (IP packets) on which the Internet is based. The Internet technology here is primarily specified in so-called RFC standards, to which the RFC 2663, RFC 2766 (NAT—Network Address Translation) and RFC 3022 (PAT—Port Address Translation) standards belong, which specify an automated conversion of address or port information in data packets for connecting different networks. These standards and protocol definitions mentioned above arose from the needs of highly complex, dynamic computer and communication networks, such as are often required in the ITC (Information and Telecommunications) industry.

The use of Ethernet-based communication technology has in the meantime also found its way into transportation vehicles. One example of this is the "SOME/IP" communication protocol developed by a consortium of transportation vehicle manufacturers, including the "SOME/IP Service Discovery", which has also been incorporated into the AUTOSAR standard (Release 4.1, in particular), and which specifies a solution for packet-over-Ethernet-based on-board communication in the transportation vehicle. This involves the transmission of TCP/IP packets (layers 3 and 4 in the OSI/ISO layer model) by Ethernet communication (layer 2 in the OSI/ISO layer model) in accordance with IP-over-Ethernet communication.

Relying as far as possible on systems and solutions already available in previous models when developing new or subsequent transportation vehicle models to avoid unnecessary new development work is, furthermore, known. Such a reuse of previous systems can, however, fail if additional options or communication connections are required in the new transportation vehicle for which the previous system is not designed and for which it is not possible to extend simply through scaling.

A lack of flexibility in transportation vehicle communication networks in terms of retrospective or temporary integration of further participants and/or of services that are provided by participants retrospectively or temporarily, is thus problematic. The integration of participants external to the transportation vehicle, for example, of mobile terminals or service apparatuses external to the transportation vehicle, is, in addition, either not possible or only possible with great effort.

DE 10 2015 200 947 B3 relates to a packet-switching device for a packet-over-Ethernet-based communication network in a transportation vehicle, in particular, a motor vehicle.

DE 10 2014 201 954 A1 relates to a method for data transmission between at least two participants, wherein at least one of the participants is designed as a vehicle-side participant, wherein the at least one vehicle-side participant makes at least one virtual machine available or is designed as a virtual machine, wherein at least one further participant transmits persistent data to the at least one virtual machine, as well as to a communication network and to a transportation vehicle.

DE 10 2014 201 948 A1 relates to a method for data transmission between at least two participants in a transportation vehicle, wherein a first participant forms a server in a client-server communication network, wherein at least one further participant forms a client in the client-server communication network, wherein a stateless communication between the first participant and the at least one further participant takes place by the data transmission, as well as to a communication network and to a transportation vehicle.

The technical problem arises of creating a method for data transmission in a transportation vehicle communication network, a communication network and a participant of such a communication network, and a transportation vehicle, which permit a simple and reliable, and, in particular, a retrospective or temporary, integration of further participants into the transportation vehicle communication network and/or which permit the particularly retrospective or temporary provision of further services in the transportation vehicle communication network.

A method for data transmission between at least two participants in a transportation vehicle communication network of a transportation vehicle is proposed.

A participant can be a control device of the transportation vehicle. Alternatively, a participant can, however, also be a device external to the transportation vehicle, e.g. a mobile terminal such as a mobile telephone, a Tablet PC or the like, or a computing apparatus external to the transportation vehicle, e.g. a server apparatus external to the transportation vehicle.

At least one participant of the transportation vehicle communication network is a transportation vehicle participant. A transportation vehicle participant here refers to a participant that is arranged in the transportation vehicle. The transportation vehicle participant can be permanently installed in the transportation vehicle. Furthermore the transportation vehicle participant can be a control device of the transportation vehicle.

The transportation vehicle communication network can, of course, comprise more than two participants, wherein the further participants can be transportation vehicle participants or participants external to the transportation vehicle.

Participants of the transportation vehicle communication network can form a server or a client in the transportation vehicle communication network. The participants are not, however, permanently defined as having the function of a server or client. It is thus possible that a participant provides a server for one or a plurality of data transmission processes and a client for one or a plurality of data transmission processes different from the first.

A server can here refer to a participant that provides or offers one or a plurality of services. A server can, for example, offer a service that makes information about a speed of the transportation vehicle available over the transportation vehicle communication network. Information about an engine temperature can also be made available over the transportation vehicle communication network as a service. A change in the volume of a car radio can also be made available over the transportation vehicle communication network as a service. The services mentioned here are purely exemplary. A large number of further services can of course also be made available by servers over the transportation vehicle communication network. Services of this sort are known to the expert.

A service can be a specified function that a server offers and that a client can use. A service can be used independently of location. Optionally, a service is offered in such a way that a client using the service does not require any information about the implementation of the service to use it. This leads to the reduction or complete removal of dependencies between the use of services and their implementation. Interfaces of a service can be designed to be upwardly and downwardly compatible. When using a service, established standards for communication can be employed with the aim of good serviceability and reusability.

A client can refer to a participant that uses an offered service.

The transportation vehicle communication network can be an Ethernet-based communication network. Data transmission can take place in such a communication network in that data packets are transmitted between participants over the communication network. The participants can comprise appropriate Ethernet interfaces. The data transmission can take place here according to known transmission protocols.

A participant can here comprise a control and evaluation apparatus for controlling the data transmission and for evaluating responses or the information contained therein. Such a control and evaluation apparatus can, for example, be provided by a microcontroller.

Data to be transmitted, data packets, in particular, can contain a destination addressing which can be given by an addressing of a single destination. Data to be transmitted, data packets, in particular, can further contain a source addressing. The addressing of destinations and sources in the network can in each case take place here by a corresponding Ethernet address/network address/port combination for the destination nodes or source nodes. In the OSI/ISO layer model it is usually possible for the Ethernet address (i.e. "Ethernet Media Access Control" (MAC) address) to be assigned to layer 2, the network address (e.g. the IP address) to layer 3, and the port (e.g. TCP port or UDP port) to layer 4. For purposes of the disclosure, an "Ethernet address/network address/port combination" can refer to an aggregation of an Ethernet address/network address (e.g. IP address) with an assigned port. A destination Ethernet address/network address/port combination thus contains the destination Ethernet address, destination network address and the assigned destination port specified in the data. Analogously, a source Ethernet address/network address/port combination contains the source Ethernet address, source network address and the assigned source port specified in the data. Relaying the data in the transportation vehicle communication network can take place on the basis of such Ethernet address/network address/port combinations.

A "port", for purposes of the disclosure, is to be understood as a supplement to a network address that brings about the assignment of connections and data to server and client programs in the transmitter participant and in the receiver participant. It can in this way be made possible for data related to different services provided by a server to be made available to a receiver (client) and to be assigned there separately to the corresponding service-related applications, although the data related to both services were transmitted from an identical network address (e.g. IP address) of the transmitter to a single network address of the receiver. Services can thus be provided through different ports to the same Ethernet address/network address e.g. MAC/IP address.

An "Ethernet interface," for purposes of the disclosure, refers to a device of a technical entity by which an Ethernet communication connection can be provided with at least one other technical entity. Such a technical entity can perhaps be a network node in an Ethernet communication network. An Ethernet interface can physically comprise a connection device for connection to a line, in particular, a standardized Ethernet line, for the Ethernet transmission. In addition, the communication interface can comprise a method or mechanism for data processing or preparation, by which data or other information can be transmitted at the transmitter end or processed at the receiver end in accordance with the standardized requirements of Ethernet communication in a predetermined way.

A "transportation vehicle," for purposes of the disclosure, refers to any kind of transportation vehicle by which one or more persons and/or loads can be transported. A transportation vehicle is, in particular, a passenger car, a truck, a motorcycle, a bus, a bicycle or a trailer attached to one of the transportation vehicles mentioned. This also applies to the traction unit as well as the trailer of a train as well as to a water craft or an aircraft, in particular, an airplane.

"Configured," for purposes of the disclosure, refers to the fact that the corresponding device is already set up to fulfill a specific function. Expanding on that, "configurable" refers to the fact that the corresponding device can be set up in such a way that, with appropriate setting, it is configured to fulfill the specific function. The configuration can take place here, for example, through an appropriate setting of parameters of a process flow or of switches or the like for activating or deactivating functionalities or settings.

The transportation vehicle participant forms a registration server of the transportation vehicle communication network, or provides a registration server. The registration server can provide a registration service or offer one.

In a registration process, the at least one further participant transmits information regarding a service category of at least one service that is provided by the further participant, and information regarding a service address, to the registration server.

The registration process can here refer to a process through which a participant which, for example, is not yet a participant in the transportation vehicle communication network, and/or at least one service that is offered by the participant, is registered with/at the transportation vehicle communication network. The participant hereby becomes a participant in the transportation vehicle communication network and/or the registered service is made available in the transportation vehicle communication network. The participant can following a successful registration process, make services available over the transportation vehicle communication network or can use offered services.

A data transmission between the registering participant and the registration server can take place in the registration process.

A data transmission between participants can here comprise one or a plurality of transmission processes. In a data transmission process, data of, for example, a request and/or data of a response can be transmitted. The request can, for example, be a client-side request, while the response can be a server-side response. A response to a request can be identified as a corresponding response.

In the registration process, the registering participant transmits information about a service category of at least one service that is provided by the further participant to the registration server. The information can, for example, be encoded through transmitted data. What is important is that information is transmitted about the service category, and thus not about the precise function/the functional scope of the service itself.

A service here can be assigned to a service category. At least one service, in particular, a plurality of services that differ from one another, can thus be assigned to a service category.

The service, for example, that provides information about the speed of the transportation vehicle over the transportation vehicle communication network can be assigned to a "Drive" category.

The service, for example, that provides information about the engine temperature of the transportation vehicle over the transportation vehicle communication network can be assigned to an "Engine" category.

The service, for example, that provides the functionality of changing the volume for the radio can be assigned to a "Radio" category.

The registering participant furthermore transmits information about a service address to the registration server.

This information too can, for example, be encoded through transmitted data. The service address can be transmitted or encoded as the destination Ethernet address/network address/port combination explained above. Other address formats can, of course, also be used.

For this purpose it can be possible that the registering participant determines an address in the transportation vehicle communication network before the registration process or that an address is assigned to it. This can, for example, take place in accordance with the known DHCP protocol. For this purpose one of the participants of the transportation vehicle communication network can provide a DHCP server, wherein this server provides the address as a service.

It is possible that the registration server has a reference address that is already known. Alternatively, the registering participant can determine an address of the registration server in the transportation vehicle communication network through making use of appropriate services.

The registration server furthermore stores the participant-specific service category, or the information related to that, and the participant-specific service address in a retrievable manner. The service category and the service address are here assigned to one another.

After storage, it is possible for participants in the transportation vehicle communication network to retrieve or to request from the registration server the information about one, or selected, although not all, or optionally about all, participant-specific service addresses that address a service that is assigned to a selected service category.

The registration server can provide an address storage service that stores the service category and the corresponding service address in a retrievable manner. For this purpose, the registration server can access at least one storage apparatus for data exchange.

The registration server can, furthermore, provide an address retrieval service, wherein the address retrieval service provides, in connection with a corresponding service category request, the information about one, or selected although not all, or optionally about all participant-specific service addresses over the transportation vehicle communication network that address a service that is assigned to a selected service category. The selected service category can here be contained in the corresponding service category request.

After the registration it is thus possible for any participant to request the service addresses of services of a desired category. After this, the functionality/the functional scope of the services and, depending on the functionality/the functional scope, the service address of a desired service can be determined, and this service can be used.

This gives rise to a determination and use of services that is simple to implement from the point of view of computing and which can be carried out rapidly, particularly in the case of services that are provided retrospectively in the transportation vehicle communication network, in particular, through new participants. In that only one service category, and not the information about the precise functionality of the service itself, is stored in a retrievable manner, services that are provided by a participant that is already a participant in the transportation vehicle communication network, can change, for example, when a software update is carried out. The change can here take place at runtime, and a complex reconfiguration of the transportation vehicle communication network is not necessary.

Altogether a method results in a simple and reliable integration of further participants into the transportation vehicle communication network and/or the provision of further services in the transportation vehicle communication network.

In a further disclosed embodiment a participant transmits a service category request over the transportation vehicle communication network to the registration server. As explained above, a desired service category can be contained or encoded in such a request. The registration server further transmits all the service addresses assigned to the service category over the transportation vehicle communication network in a response, to the requesting participant. The requesting participant thus receives the address information for all the provided services of a desired service category. Through this a data quantity is reduced in comparison to a data quantity that is necessary for the transmission of information about the functionality of the individual services, while the participant nevertheless receives information about all the services available under a service category, namely information about their service addresses.

In a further disclosed embodiment, the participant transmits a service request to at least one server participant to which one of the service addresses is assigned over the transportation vehicle communication network. In a response, the at least one server participant further transmits information about the at least one service provided under this service address, in particular, information about a functionality of the service, to the participant.

The participant can, of course, transmit a plurality of service requests to respective service addresses that differ from one another, in particular, to selected although not all or to all service addresses that were provided in the response to the service category request. Depending on the information provided about the services provided under the service addresses, the requesting participant can then determine whether it wants to use a service, and if so which.

From this it follows that all the provided services can be determined and, if appropriate, used by a participant at runtime reliably, quickly and in a manner that is easy to implement.

In a further disclosed embodiment the participant determines a desired service depending on the information about the services provided. This was already explained above. The participant further transmits a service execution request over the transportation vehicle communication network to the server participant that provides the desired service. The service execution request can here initiate execution of the service, and thus its use. The corresponding service can thus be executed. During the execution of the service, however, further requests/responses can be transmitted over the transportation vehicle communication network.

As a result of this, a desired service may be quickly and reliably determined and used at runtime.

In a further disclosed embodiment, a service is assigned to a service category of lighting, media, doors and hatches, chassis, drive, engine or a further service category. Services of the lighting service category can, for example, provide functions for and/or information about a transportation vehicle lighting, in particular, an interior or exterior lighting. Services of the media service category can, for example, provide functions for and/or information about media devices in the transportation vehicle, for example, devices of an infotainment system. Services of the doors and hatches service category can, for example, provide functions for and/or information about transportation vehicle doors and hatches that can be closed and are to be opened. Services of the chassis service category can, for example, provide functions for modifying the properties of the chassis and/or information about the chassis. Services of the drive service category can, for example, provide functions for the control of the drive and/or information about drive variables. Services of the engine service category can, for example, provide functions for control of the engine and/or information about engine parameters.

The service categories may be chosen in such a way that if possible all currently available and future services can be assigned to a category.

This results in a categorization of services that enables a determination at runtime of services that is effective in terms of computing and, if relevant, a use of services, in particular, including services that change or are only temporarily available.

In a further disclosed embodiment, the participant-specific service category and the participant-specific service address are deleted if a participant transmits a deregister request to the registration server. A deregister request can, for example, be generated when a user deregisters the participant from the transportation vehicle communication network through, for example, a user input.

Alternatively, the participant-specific service category and the participant-specific service address are deleted if no data can be transmitted between the registration server and the participant. It is, for example, possible that data such as test data for testing the availability of the data transmission is transmitted continuously or periodically to all the service addresses that are retrievably stored. This can, for example, be done by the registration server or by a service that is provided by the registration server or a further participant. If it is detected that no data transmission is possible from and to a service under the service address, this service address and the service category assigned to it can be deleted. It is furthermore possible that similar service addresses, e.g. addresses with the same Ethernet address/network address combination are also deleted in this case.

Alternatively, the participant-specific service category and the participant-specific service category address are deleted if a transportation vehicle terminal cycle is ended. All or selected although not all stored service categories and service addresses can be deleted when a transportation vehicle terminal cycle is ended.

The deletion can here be performed by the registration server.

After a transportation vehicle terminal cycle has started again, it can then be necessary for all participants, or participants of the transportation vehicle communication network that are not yet registered, to register again.

It is, of course, possible that at least one service category and a service address assigned to it are not deleted, in particular, not when a transportation vehicle terminal cycle is ended. These can be stored in a permanently retrievable manner. These can, for example, address services that are provided by participants that are/become participants of the transportation vehicle communication network after every new start, in particular, participants that are provided by control devices permanently installed in the transportation vehicle.

In a further disclosed embodiment a stateless communication takes place by the data transmission between participants of the transportation vehicle communication network.

A stateless communication of this sort is described in DE 10 2014 201 948 A1, referred to at the beginning, to the full scope of whose disclosed content reference is hereby made.

Stateless can mean that the data of a complete, client-side request and/or data of a complete, server-side response are transmitted in each case in precisely one transmission process. The server-side response can here be a response to the client-side request, in which case such a response can be referred to as a corresponding response. Stateless can, inter alia, also mean that all the information that is necessary for the execution of at least one server-side operation is transmitted from the client to the server in precisely one transmission process. Stateless can further mean that all the information that is necessary for the execution of at least one client-side operation is transmitted from the server to the client in precisely one transmission process. Stateless can further also mean that all the information that is necessary for the confirmation of at least one operation requested by a server is transmitted from the client to the server in precisely one transmission process. Stateless can further also mean that all the information that is necessary for the execution of at least one operation requested by a client is transmitted from the server to the client in precisely one transmission process. This means that it is no longer necessary to transmit a client-side request or a server-side response in a sequence comprising a plurality of transmission processes, as has formerly been usual. A single transmission process here refers to a part of a total sequence that is necessary for a synchronization of the states in the client and server.

Requests, in particular, client-side requests, can be here be, for example, a read request, a write request or a delete request which respectively initiate a read operation, a write operation or a delete operation on the server side or the client side. A write request can here be a create request or an update request. At least one request and/or response in the registration process explained above can also be an address storage request, a service category request, a service execution request, a service request or corresponding response requests and responses of a stateless data transmission.

In other words, stateless can also mean that a participant does not require any information about the state of a further participant to carry out a data transmission with this for a desired purpose, e.g. for the use of a service. Stateless can also mean that the participants can execute operations on the basis of the information transmitted in the transmission process and do not require further knowledge, in particular, further knowledge about communication processes that have already taken place and/or the information transferred within them.

As an alternative to the retrievable storage of service categories and service addresses assigned to them by/in the registration server, the determination of services that can be provided by servers over the transportation vehicle communication network can also take place in a so-called multicast method. A participant can here transmit, e.g. periodically, information about the services it provides, in particular, information about their functionality and/or about the corresponding service categories, as well as the assigned service address to all participants of the transportation vehicle communication network. In this case, participants can store the corresponding information and subsequently use it for determining and executing services. This can, for example, take place using the SOME/IP standard.

A transportation vehicle communication network is furthermore proposed. The transportation vehicle communication network comprises at least two participants, wherein at least one participant of the transportation vehicle communication network is a transportation vehicle participant that is arranged in the transportation vehicle. The participants can here be connected for data exchange over the transportation vehicle communication network. A connection for data exchange can here be a wired or, however, a wireless connection.

The transportation vehicle participant forms a registration server of the transportation vehicle communication network, or provides such a server. In a registration process, further, information about a service category of at least one service that is provided by the further participant, and information about a service address, can be transmitted by the at least one further participant to the registration server over the transportation vehicle communication network. The participant-specific service category and the participant-specific service address can further be stored by the registration server in a retrievable manner.

A method according to one of the disclosed embodiments described in this disclosure can be carried out by the transportation vehicle communication network. The transportation vehicle communication network can thus be designed/configured in such a way that such a method can be carried out by the transportation vehicle communication network.

The transportation vehicle communication network can, in addition to at least one transportation vehicle participant, also comprise further transportation vehicle participants and/or participants external to the transportation vehicle, in particular, mobile terminals or server apparatuses external to the transportation vehicle. The transportation vehicle communication network can further comprise data relaying apparatuses or participants.

A participant of a transportation vehicle communication network according to one of the disclosed embodiments explained in this disclosure is further proposed, wherein the participant forms or provides a registration server of the transportation vehicle communication network.

The participant can thus provide an address storage service and an address retrieval service in the transportation vehicle communication network.

A transportation vehicle is further proposed, wherein the transportation vehicle comprises at least one transportation vehicle participant of a transportation vehicle communication network, wherein the transportation vehicle participant forms or provides a registration server of the transportation vehicle communication network.

Identical reference signs below indicate elements with the same or similar technical features.

Figure 1:
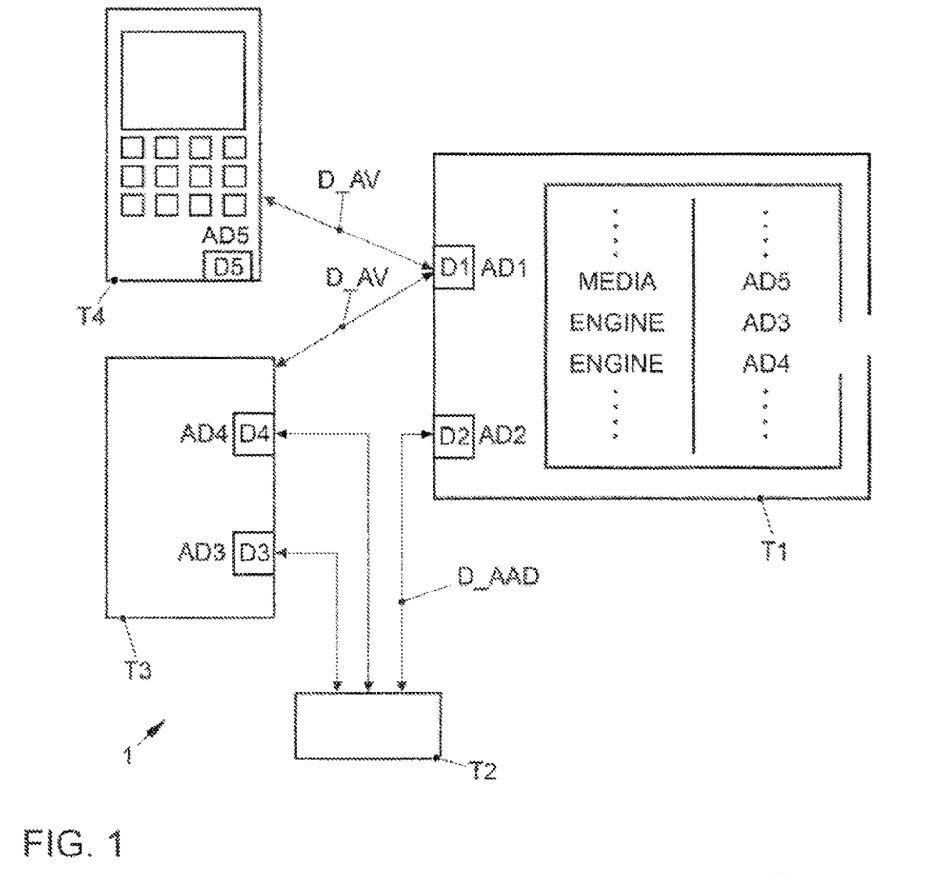
FIG. 1 shows a schematic block diagram of a transportation vehicle communication network.

FIG. 1 shows a schematic block diagram of a transportation vehicle communication network 1, wherein the transportation vehicle communication network 1 comprises four participants T1, T2, T3, T4. A first participant T1 here is a transportation vehicle participant and is designed as a registration server. A second participant T2 is also a transportation vehicle participant. A third participant T3 is also a transportation vehicle participant and is designed, for example, as an engine control device. A fourth participant T4 is a participant external to the transportation vehicle and is designed, for example, as a mobile telephony device.

The first participant T1, the third participant T3 and the fourth participant T4 provide services D1, D2, D3, D4, D5 over the transportation vehicle communication network 1. The participants T1, T3, T4 can thus be designed as servers. The participants T1, T3, T4 can also, of course, form clients, in particular, if they use services, not illustrated, of further servers.

A first service D1 of the first participant T1 is, for example, an address storage service. A service category of a service D3, D4, D5 and an address AD3, AD4, AD5 assigned to this service can be stored in the transportation vehicle communication network 1 using this service D1, in particular, in a storage apparatus to which the first participant 1 has access. Information about the service category and the service address AD3, AD4, AD5 can be transmitted over the transportation vehicle communication network 1 to the first participant T1 by further participants T3, T4.

A further service D2 of the first participant T1 is, for example, an address retrieval service. Information about service addresses AD3, AD4, AD5 of services D3, D4, D5, that are assigned to a desired service category, can be made available to a participant T2 through this address retrieval service over the transportation vehicle communication network 1. A first service D3 of the third participant T3 can, for example, be a service that makes information about an engine temperature available over the transportation vehicle communication network 1. A further service D4 of the third participant T3 can, for example, be a service that makes information about an engine speed available over the transportation vehicle communication network 1.

A service D5 of the fourth participant T4 can, for example, be a service that makes music data that is, for example, stored on the fourth participant T4 available over the transportation vehicle communication network 1.

In a registration process that is explained by way of example for the fourth participant T4, the fourth participant T4 transmits information about the service category of the services it provides, which in the present case is thus information about the "MEDIA" service category of the service D5, and the service address AD5 assigned to this service, to the first participant T1 by making use of the address storage service.

The first participant T1 stores this "MEDIA" service category and the service address AD5 retrievably and in a manner assigned to each other. In the present case, the service D5 referred to is assigned to a "MEDIA" service category, and a first address AD5 is assigned to it.

The first participant T1 has accordingly already stored an "ENGINE" service category of the services D3, D4 and their associated service addresses AD3, AD4.

The data transmission processes of the registration processes required for this is illustrated schematically through arrows D_AV.

The service addresses AD1, AD2, AD3, AD4, AD5, or at least a portion of them, can be assigned to a participant T1, T2, T3, T4 of a DHCP server (not illustrated) of the transportation vehicle communication network 1. Service addresses AD1, AD2, AD3, AD4, AD5 of different services D1, D2, D3, D4, that are provided by a participant T1, T3, can, for example, have the same MAC/IP portion but different ports in a MAC/IP/port address.

The second participant T2 wants to request a current engine temperature over the transportation vehicle communication network 1. It is already known here that a corresponding service is assigned to the "ENGINE" service category.

The second participant T2 uses the address retrieval service D2, which is provided by the first participant T1, for this purpose. A corresponding data transmission is indicated schematically with D_AAD. The second participant T2 transmits an address retrieval request to the first participant T1, wherein this address retrieval request contains or encodes the desired "ENGINE" service category. In response to the address retrieval request, the first participant T1 transmits the stored service addresses AD3, AD4 of all the services D3, D4 that are assigned to the desired "ENGINE" service category.

After receiving the service addresses AD3, AD4, the second participant T2 requests further information about these services D3, D4, in that it requests the third participant T3 with a service request under the corresponding service address AD3, AD4. As a response to this service request, information about these services D3, D4, in particular, about their functionality, is transmitted to the second participant T2. This can then determine the desired service D3, and transmit a service retrieval request to this first service D3 of the third participant T3. The third participant T3 can then execute the service D3, and transmit information about an engine temperature to the second participant T2.

The information about the service categories of services D3, D4, D5 and the service addresses AD3, AD4, AD5 assigned to these services D3, D4, D5, i.e. also information about the assignment, can be stored as a table, in particular, a lookup table, that is illustrated schematically in FIG. 1.

The information about the service categories of services D3, D4, D5 and the service addresses AD3, AD4, AD5 assigned to these services D3, D4, D5 can be deleted from the assignment and thus no longer be retrievable if a participant T2, T3, T4 is no longer a participant of the transportation vehicle communication network 1. This can, for example, be detected if the participant T2, T3, T4, or the corresponding service, carries out a deregistration process. This can further be detected if data transmission is no longer possible to the participant T2, T3, T4.

The data transmission between the participants T1, T2, T3, T4, in particular, the data transmission during the execution of the services D1, D2, D3, D4, D5 that have been referred to can be data transmissions of a stateless communication.

Figure 2:
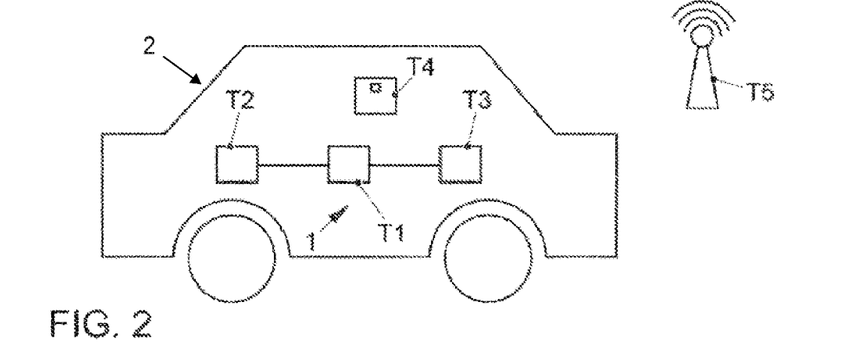
FIG. 2 shows a schematic illustration of a transportation vehicle.

FIG. 2 shows a schematic illustration of a transportation vehicle 2. The transportation vehicle 2 comprises participants T1, T2, T3, T4, T5 of a transportation vehicle communication network 1. The transportation vehicle 2 comprises a transportation vehicle participant 1 that is designed as a registration server. The transportation vehicle communication network 1 can further comprise a participant T4, T5 that is external to the transportation vehicle, i.e. a participant T4, T5 that is not installed in the transportation vehicle 2. The fourth participant T4 can, for example, be a mobile telephony device and the fifth participant T5 an external server.

It is, for example, possible for the transportation vehicle 2 illustrated to be a commercial transportation vehicle to which loading and unloading equipment, not illustrated, can be coupled or connected. Such loading and unloading equipment, for example, a loading crane, can be connected mechanically and/or through signals and/or through data communication to the transportation vehicle communication network 1, wherein a control device of the loading and unloading equipment can become a participant of the transportation vehicle communication network 1. The control device can then provide services for control of the loading and unloading equipment or services for requesting status information of the loading and unloading equipment over the transportation vehicle communication network 1. This can be used to use the loading and unloading equipment for a corresponding loading or unloading process. After completing the loading or unloading process, the control device of the loading and unloading equipment can then deregister from the transportation vehicle communication network 1, and the connections between the loading and unloading equipment can be disconnected. This example illustrates how services that are only required temporarily can be provided over the transportation vehicle communication network 1.

Figure 3:
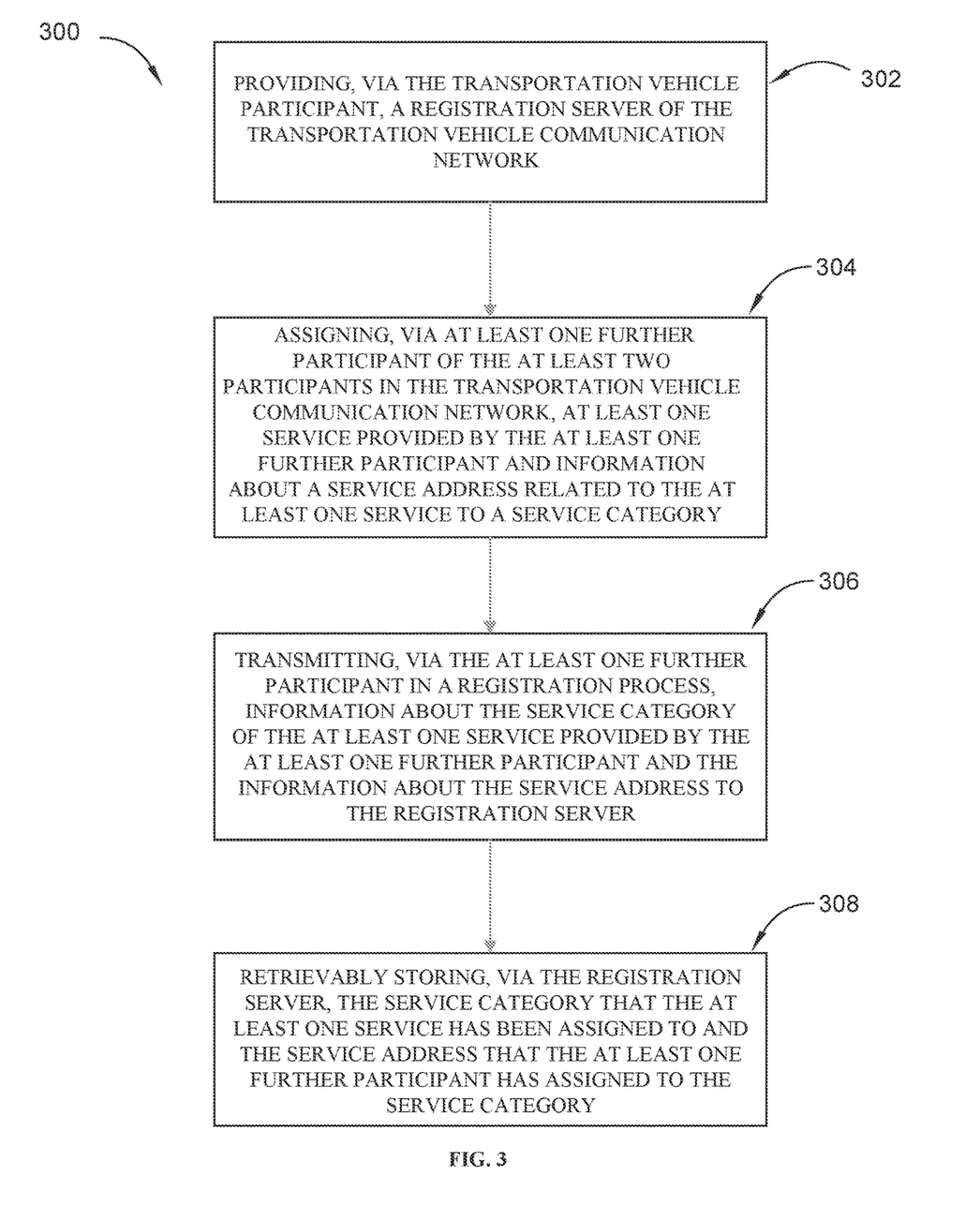
FIG. 3 shows a method for data transmission according to the present disclosure.

FIG. 3 shows a method 300 for data transmission between at least two participants in a transportation vehicle communication network of a transportation vehicle, at least one participant of the at least two participants in the transportation vehicle communication network being a transportation vehicle participant arranged in the transportation vehicle. The method 300 includes a first operation 302 of providing, via the transportation vehicle participant, a registration server of the transportation vehicle communication network. The method 300 further includes a second operation 304 of assigning, via at least one further participant of the at least two participants in the transportation vehicle communication network, at least one service provided by the at least one further participant and information about a service address related to the at least one service to a service category.

The method 300 further includes a third operation 306 of transmitting, via the at least one further participant in a registration process, information about the service category of the at least one service provided by the at least one further participant and the information about the service address to the registration server. The method 300 further includes a fourth operation 308 of retrievably storing, via the registration server, the service category that the at least one service has been assigned to and the service address that the at least one further participant has assigned to the service category. In a disclosed embodiment, one of the at least two participants transmits a service category request to the registration server, and the registration server transmits all service addresses assigned to the service category in a response.

LIST OF REFERENCE SIGNS

1 Transportation vehicle communication network
2 Transportation vehicle
T1 First participant
T2 Second participant
T3 Third participant
T4 Fourth participant
T5 Fifth participant
D1 First service of the first participant
D2 Further service of the first participant
D3 First service of the third participant
D4 Further service of the third participant
D5 Service of the fourth participant
AD1 Service address
AD2 Service address
AD3 Service address
AD4 Service address
AD5 Service address
D_AV Data transmission in the registration process
D_AAD Data transmission in the address-storage request

The invention claimed is:

1. A method for data transmission between at least two participants in a transportation vehicle communication network of a transportation vehicle, wherein at least one participant of the at least two participants in the transportation vehicle communication network is a transportation vehicle participant arranged in the transportation vehicle, the method comprising:
providing, via the transportation vehicle participant, a registration server of the transportation vehicle communication network;
assigning, via at least one further participant of the at least two participants in the transportation vehicle communication network, at least one service provided by the at least one further participant and information about a service address related to the at least one service to a service category;
transmitting, via the at least one further participant in a registration process, information about the service category of the at least one service provided by the at least one further participant and the information about the service address to the registration server; and
retrievably storing, via the registration server, the service category that the at least one service has been assigned to and the service address that the at least one further participant has assigned to the service category,
wherein one of the at least two participants transmits a service category request to the registration server, wherein the registration server transmits all service addresses assigned to the service category in a response.

2. The method of claim 1, wherein the one of the at least two participants transmits a service request to at least one server participant of the at least two participants to which one of the service addresses is assigned, wherein the at least one server participant transmits information about at least one service provided under this service address to the participant in a response.

3. The method of claim 2, wherein the one of the at least two participants determines a desired service depending on the information about a provided service, wherein the participant transmits a service execution request to the server participant that provides the desired service.

4. The method of claim 1, wherein a service is assigned to a service category of lighting, media, doors and hatches, chassis, drive, engine or a further service category.

5. The method of claim 1, wherein the service category that the at least one service has been assigned to and the service address that the at least one further participant has assigned to the service category are deleted in response to a further participant transmitting a deregister request to the registration server, or in response to no data being transmitted between the registration server and the one of the at least two participants, or in response to a transportation vehicle terminal cycle ending.

6. The method of claim 1, wherein stateless communication takes place by the data transmission between the at least two participants of the transportation vehicle communication network.

7. The method of claim 1, further comprising:
determining an availability of data transmission between the registration server and the at least one further participant via at least one participant of the at least two participants transmitting test data between the registration server and the one of the at least two participants, wherein the service category that the at least one service has been assigned to and the service address that the at least one further participant has assigned to the service category are deleted in response to a determination that data transmission is unavailable.

8. The method of claim 1, further comprising:
transmitting, periodically, via the at least one further participant of the at least two participants, information about the at least one service provided by the at least one further participant, information about the service address related to the at least one service, and information about the service category, to all participants of the at least two participants of the transportation vehicle communication network.

9. A transportation vehicle communication network comprising at least two participants, wherein at least one participant of the at least two participants in the transportation vehicle communication network is a transportation vehicle participant arranged in the transportation vehicle, wherein the transportation vehicle participant provides a registration server of the transportation vehicle communication network, wherein at least one further participant of the at least two participants in the transportation vehicle communication network assigns at least one service provided by the at least one further participant and information about a service address related to the at least one service to a service category, wherein the at least one further participant transmits information about the service category of the at least one service provided by the at least one further participant and the information about the service address to the registration server in a registration process, and wherein the registration server retrievably stores the service category that the at least one service has been assigned to and the service address that the at least one further participant has assigned to the service category, and wherein one of the at least two participants transmits a service category request to the registration server, wherein the registration server transmits all service addresses assigned to the service category in a response.

10. The transportation vehicle communication network of claim 9, wherein the one of the at least two participants transmits a service request to at least one server participant of the at least two participants to which one of the service addresses is assigned, wherein the at least one server participant transmits information about at least one service provided under this service address to the participant in a response.

11. The transportation vehicle communication network of claim 9, wherein the one of the at least two participants determines a desired service depending on the information about a provided service, wherein the participant transmits a service execution request to the server participant that provides the desired service.

12. The transportation vehicle communication network of claim 9, wherein a service is assigned to a service category of lighting, media, doors and hatches, chassis, drive, engine or a further service category.

13. The transportation vehicle communication network of claim 9, wherein the service category that the at least one service has been assigned to and the service address that the at least one further participant has assigned to the service category are deleted in response to a further participant transmitting a deregister request to the registration server, or in response to no data being transmitted between the registration server and the one of the at least two participants, or in response to a transportation vehicle terminal cycle ending.

14. The transportation vehicle communication network of claim 9, wherein stateless communication takes place by the data transmission between the at least two participants of the transportation vehicle communication network.

15. The transportation vehicle communication network of claim 9, wherein an availability of data transmission between the registration server and the at least one further participant is determined via at least one participant of the at least two participants transmitting test data between the registration server and the one of the at least two participants, wherein the service category that the at least one service has been assigned to and the service address that the at least one further participant has assigned to the service category are deleted in response to a determination that data transmission is unavailable.

16. The transportation vehicle communication network of claim 9, wherein information about the at least one service provided by the at least one further participant, information about the service address related to the at least one service, and information about the service category, is transmitted, periodically, via the at least one further participant of the at least two participants to all participants of the at least two participants of the transportation vehicle communication network.

17. A participant in a transportation vehicle communication network comprising at least two participants, wherein at least one participant of the at least two participants in the transportation vehicle communication network is a transportation vehicle participant arranged in the transportation vehicle, wherein the transportation vehicle participant provides a registration server of the transportation vehicle communication network, wherein at least one further participant of the at least two participants in the transportation vehicle communication network assigns at least one service provided by the at least one further participant and information about a service address related to the at least one service to a service category, wherein the at least one further participant transmits information about the service category of the at least one service provided by the at least one further participant and the information about the service address to the registration server in a registration process, and wherein the registration server retrievably stores the service category that the at least one service has been assigned to and the service address that the at least one further participant has assigned to the service category, wherein the participant provides a registration server of the transportation vehicle communication network, and wherein one of the at least two participants transmits a service category request to the registration server, wherein the registration server transmits all service addresses assigned to the service category in a response.

18. A transportation vehicle comprising at least one transportation vehicle participant of a transportation vehicle communication network comprising at least two participants, wherein at least one participant of the at least two participants in the transportation vehicle communication network is a transportation vehicle participant arranged in the transportation vehicle, wherein the transportation vehicle participant provides a registration server of the transportation vehicle communication network, wherein at least one further participant of the at least two participants in the transportation vehicle communication network assigns at least one service provided by the at least one further participant and information about a service address related to the at least one service to a service category, wherein the at least one further participant transmits information about the service category of the at least one service provided by the at least one further participant and the information about the service address to the registration server in a registration process, and wherein the registration server retrievably stores the service category that the at least one service has been assigned to and the service address that the at least one further participant has assigned to the service category, wherein the transportation vehicle participant provides a registration server of the communication network, and wherein one of the at least two participants transmits a service category request to the registration server, wherein the registration server transmits all service addresses assigned to the service category in a response.

* * * * *